(12) United States Patent
Sato et al.

(10) Patent No.: US 8,296,531 B2
(45) Date of Patent: Oct. 23, 2012

(54) STORAGE SYSTEM, CONTROL UNIT, IMAGE FORMING APPARATUS, IMAGE FORMING METHOD, AND COMPUTER READABLE MEDIUM

(75) Inventors: Jun Sato, Saitama (JP); Shohei Ikenoue, Saitama (JP); Kentaro Fukami, Saitama (JP); Akiyoshi Osugi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 665 days.

(21) Appl. No.: 12/198,736

(22) Filed: Aug. 26, 2008

(65) Prior Publication Data
US 2009/0248998 A1 Oct. 1, 2009

(30) Foreign Application Priority Data
Mar. 25, 2008 (JP) ................... 2008-077122

(51) Int. Cl.
*G06F 12/00* (2006.01)
(52) U.S. Cl. ...................................... 711/154
(58) Field of Classification Search ............... None
See application file for complete search history.

(56) References Cited

U.S. PATENT DOCUMENTS

| | | | | |
|---|---|---|---|---|
| 5,634,033 | A * | 5/1997 | Stewart et al. | 711/114 |
| 5,754,756 | A | 5/1998 | Watanabe et al. | |
| 6,275,898 | B1 * | 8/2001 | DeKoning | 711/114 |
| 6,742,137 | B1 * | 5/2004 | Frey, Jr. | 714/6.22 |
| 2001/0028779 | A1 * | 10/2001 | Harnois | 386/1 |
| 2002/0156971 | A1 | 10/2002 | Jones et al. | |
| 2003/0088803 | A1 * | 5/2003 | Arnott et al. | 714/5 |
| 2005/0206948 | A1 * | 9/2005 | Uejo | 358/1.15 |
| 2006/0268340 | A1 | 11/2006 | Futami | |

FOREIGN PATENT DOCUMENTS

| | | |
|---|---|---|
| JP | 06-067808 A | 3/1994 |
| JP | 08-249132 A | 9/1996 |
| JP | 10-329392 A | 12/1998 |
| JP | 2002-204330 A | 7/2002 |
| JP | 2004-525464 A | 8/2004 |
| JP | 2006-252165 A | 9/2006 |
| JP | 2006-331076 A | 12/2006 |
| JP | 2006-333110 A | 12/2006 |

OTHER PUBLICATIONS

Notification of Reasons for Refusal in counterpart Japanese Application No. 2008-077122, dated Feb. 23, 2010.
Notification of Reason for Refusal dated Oct. 26, 2010, issued by the Japan Patent Office in counterpart Japanese application No. 2008-077122.

* cited by examiner

*Primary Examiner* — Duc Doan
(74) *Attorney, Agent, or Firm* — Sughrue Mion, PLLC

(57) ABSTRACT

A storage system includes: N pieces of storages that stores electronic information, N being an integral number that is two or more; and a controller that obtains electronic information to be written, wherein the controller, in a case where the electronic information to be written is a first kind of electronic information, divides the electronic information to be written into N pieces, and independently writes the divided electronic information into each of the N pieces of storage, and the controller, in the electronic information to be written is a second kind of electronic information, redundantly writes the electronic information to be written into each of the N pieces of storage.

19 Claims, 8 Drawing Sheets

FIG. 7

HDD FAILURE PROCESSING SETTING

- ● STOP
- ○ LOW SPEED OUTPUT
- ○ LOW RESOLUTION OUTPUT
- ○ STOP OF SPECIFIC FUNCTION

STORAGE SYSTEM, CONTROL UNIT, IMAGE FORMING APPARATUS, IMAGE FORMING METHOD, AND COMPUTER READABLE MEDIUM

CROSS-REFERENCE TO RELATED APPLICATIONS

This application is based on and claims priority under 35 U.S.C. 119 from Japanese Patent Application No. 2008-077122 filed Mar. 25, 2008.

BACKGROUND

1. Technical Field

The present invention relates to a storage system, a control unit, an image forming apparatus, an image forming method, and a computer readable medium.

2. Related Art

As a technology for controlling a plurality of hard disks (magnetic disk devices) collectively as a single hard disk, there is known a RAID (Redundant Arrays of Inexpensive Disks) method. According to this technology, since data are recorded dispersingly in a plurality of hard disks, there can be realized high speed performance and high reliability performance. The RAID method is classified into several levels. Specifically, in order to obtain the high speed performance, there is used a RAID0 (striping) method; to obtain the high reliability performance, there is used a RAID1 (mirroring) method; and, to obtain both the high speed and high reliability performance, there is used RAID10 (striping+mirroring) method.

SUMMARY

According to an aspect of the present invention, storage system includes: N pieces of storages that stores electronic information, N being an integral number that is two or more; and a controller that obtains electronic information to be written, wherein the controller, in a case where the electronic information to be written is a first kind of electronic information, divides the electronic information to be written into N pieces, and independently writes the divided electronic information into each of the N pieces of storage, and the controller, in the electronic information to be written is a second kind of electronic information, redundantly writes the electronic information to be written into each of the N pieces of storage.

BRIEF DESCRIPTION OF THE DRAWINGS

Exemplary embodiment of the present invention will be described in detail based on the following figures, wherein:

FIG. 7 is a view of an example of an operation setting screen for storage device failure employed in a composite machine.

DETAILED DESCRIPTION

Now, description will be given below of an embodiment according to the invention with reference to the accompanying drawings.

Figure 1:
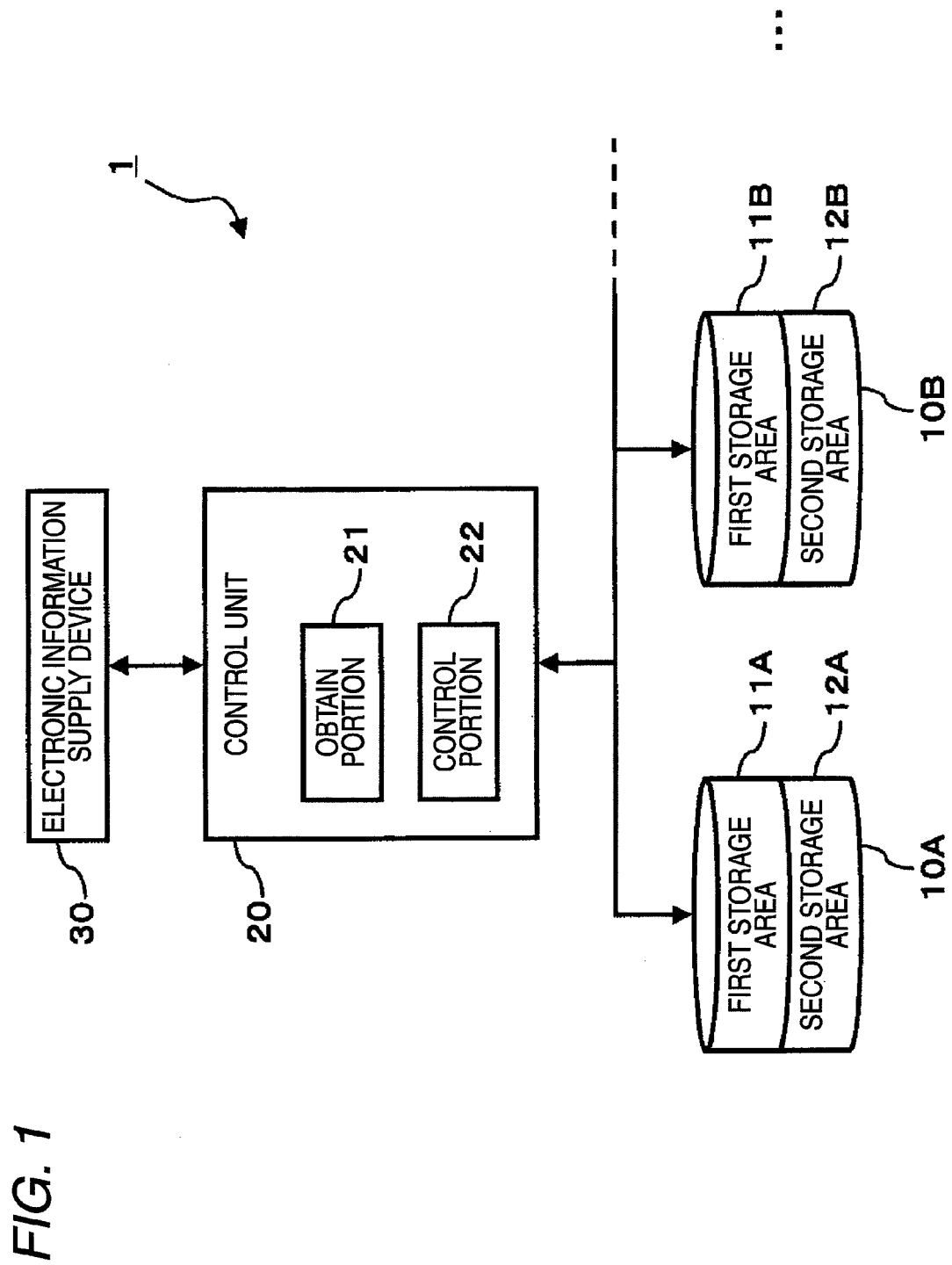
FIG. 1 is a block diagram of an example of the structure of a storage system according to an embodiment of the invention.

FIG. 1 is a block diagram of an example of the structure a storage system 1 according to the embodiment of the invention. In FIG. 1, a storage system 1 includes N (N is an integral number which 2 or more) pieces of storage devices 10A, 10B, . . . , and a control unit 20. Here, in the following description, the storage devices 10A, 10B, . . . are generically referred to as "a storage device 10" unless it is necessary to specially distinguish them from each other.

The storage device 10 is a device which stores electronic information. The storage device 10 is, for example, a hard disk (a magnetic disk device) but it may also be other kinds of storage devices such as a solid state disk device (SSD: Solid State Drive). The electronic information is, for example, image data, sound data, movie data, data of various kinds of application software, and other similar types of information.

The control unit 20 is a device which carries out a control operation to obtain electronic information to be written and write the thus obtained electronic information to be written into the storage device 10. The control unit 20 may also carry out a control operation to read out the electronic information from the storage device 10 and a control operation to delete the electronic information stored in the storage device 10.

The control unit 20, according to an embodiment, can be realized by the cooperation of a hardware resource and software; for example, a computer. Specifically, the function of the control unit 20 can be realized in such a manner that a program stored in a recording medium is read out by a main memory and is executed by a CPU (Central Processing Unit). The above program can be provided in such a manner that it is recorded into a recording medium such as a CD-ROM which can be read by a computer, or it can be provided through communication in the form of a data signal. However, the control unit 20 may also be realized by only hardware. Also, the control unit 20 can also be realized physically by a single device or by a plurality of devices.

According to the present embodiment, from a viewpoint that, while holding down the number of storage devices 10 used, both high speed performance and high reliability performance can be realized, the control device 20 is structured in the following manner.

In FIG. 1, the control unit 20 includes, as function blocks, an obtain portion 21 and a control portion 22.

The obtain portion 21 obtains electronic information to be written into N pieces of storage devices 10. In an example shown in FIG. 1, the obtain portion 21 accepts electronic information to be written from an electronic information supply device 30.

In one embodiment, the electronic information supply device 30 is provided physically integrally with the control device 20. For example, the control unit 20 and electronic information supply device 30 can be realized by a single computer. In this case, for example, the control device 20 is realized by an operating system (OS) or the like, while the electronic information supply device 30 is realized by application software. In the other embodiment, the electronic information supply device 30 is provided physically separately from the control unit 20. For example, the control unit 20 and electronic information supply device 30 can be realized by two computers which are connected together in such a manner that they can be communicated with each other.

The obtain portion 21 may accept not only the electronic information to be written but also a specification for the destination of the present electronic information, or may accept only the electronic information to be written. That is, the obtain portion 21 may obtain the electronic information the write destination of which is specified, or may obtain the electronic information the write destination of which is not specified.

The control portion 22, when the electronic information to be written obtained by the obtain portion 21 is a first kind of electronic information, divides the present electronic information to be written into N pieces of electronic information and writes them into the N pieces of storage devices 10 respectively; and, when the electronic information to be written is a second kind of electronic information, the control portion 22 writes the electronic information to be written into each of the N pieces of storage devices 10 overlappingly. For example, when the electronic information to be written is the first kind of electronic information, the control portion 22 writes the electronic information to be written into the N pieces of storage devices 10 according to a striping method (RAID0) in which data are divided and written into a plurality of storage devices; and, when the electronic information to be written is the second kind of electronic information, the control portion 22 writes the electronic information to be written into each of the N pieces of storage devices 10 overlappingly according to a mirroring method (RAID1) in which the same data are written into each of a plurality of storage devices overlappingly. Here, RAID0 and RAID1 may be realized by a hardware method using hardware such as a RAID controller, or may be realized by a software method using software such as an OS.

The first kind of electronic information, for example, includes: electronic information not requiring long storage; electronic information of low significance; electronic information not requiring high reliability performance; electronic information requiring high speed performance; and, electronic information to be stored temporarily in the storage device 10. On the other hand, the second kind of electronic information, for example, includes: electronic information requiring long storage; electronic information of high significance; electronic information requiring high reliability performance; and, electronic information not requiring high speed performance. When the storage system 1 is used in a printing apparatus or a composite machine, as the electronic information requiring high speed performance, there can be used raster data which relate to a copy or a print. The raster data are written into the storage device 10 before printed and are deleted after printed. That is, for the raster data, the storage device 10 is used as a temporary storage area. When the storage system 1 is used in a printing apparatus or a composite machine, as the electronic information requiring high reliability performance, there can be used, for example, various kinds of system data, facsimile receiving documents, PDL (Page Description Language) data of a print, and user setting data. Here, the composite machine means a machine which has at least two of a copy function, a printer function, and a facsimile function.

In one embodiment, as shown in FIG. 1, in each of N pieces of storage devices 10A, 10B, . . . , there are previously set two kinds of storage areas: that is, first storage areas 11A, 11B, . . . for use in a method in which electronic information is divided and written into a plurality of storage devices divisionally; and, second storage areas for use in a method in which electronic information is written into each of a plurality of storage devices overlappingly. And, when the electronic information to be written is the first kind of electronic information, the control unit 20 divides and writes the electronic information to be written into N pieces of first storage areas 11A, 11B, . . . divisionally; and, when the electronic information to be written is the second kind of electronic information, the control unit 20 writes the electronic information to be written into each of N pieces of second storage areas 12A, 12B, . . . overlappingly.

For example, the above-mentioned N pieces of first storage areas 11A, 11B, . . . are respectively partitions and constitute a stripe volume which is a logic volume. Also, the N pieces of second storage areas 12A, 12B, . . . are respectively partitions and constitute a mirror volume which is a logic volume.

From the viewpoint of realizing high speed access, the first storage areas 11A, 11B, . . . are set, for example, in such areas of the storage areas of the storage device 10 that can be accessed at a high speed. When the storage device 10 is a hard disk, the first areas 11A, 11B, . . . are set, for example, in the outer peripheral side area of the hard disk.

By the way, in the following description, when the first storage areas 11A, 11B, . . . need not be distinguished from each other specially, they are generically referred to as "a first storage area 11". And, when the second storage areas 12A, 12B, . . . need not be distinguished from each other specially, they are generically referred to as "a second storage area 11".

In one embodiment, when the electronic information to be written is electronic information in which a first storage area is specified as the writing destination thereof, the control unit 20 divides and writes the present electronic information to be written into N pieces of first storage areas 11 divisionally; and, when the electronic information to be written is electronic information in which a second storage area is specified as the writing destination thereof, the control unit 20 writes the electronic information to be written into each of the N pieces of second storage areas 12 overlappingly.

Figure 2:
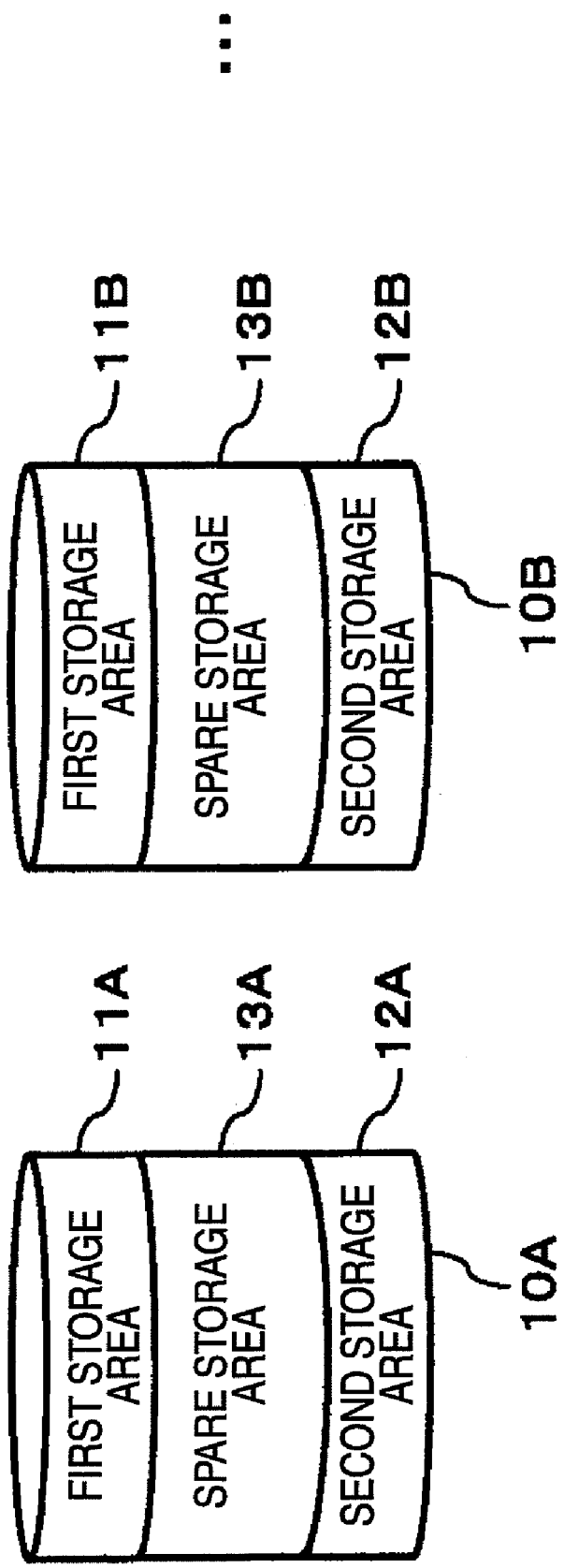
FIG. 2 is a view of an example of a storage area formed in a storage device.

Also, in an embodiment, as shown in FIG. 2, in the respective N pieces of storage devices 10A, 10B, . . . , there are previously set spare storage areas 13A, 13B, . . . respectively which have a storage capacity as equal to or as substantially equal to a storage capacity which is (N−1) times as large as the storage capacity of the first storage area. The present spare storage are as 13A, 13B, . . . are, for example, areas which are formed continuous with the first storage area 11. Here, the storage capacity substantially equal to a storage capacity which is (N−1) times as large as the storage capacity of the first storage area 11 is, for example, a storage capacity substantially equal to such storage capacity that is (N−1) times as large as the storage capacity of the first area 11 the composing unit of which can realize, when such storage capacity (N−1) times as large as the storage capacity of the first area 11 cannot be realized by a composing unit such as the bit width, sector, cluster, partition or the like of the storage device 10. According to this embodiment, in one example, the above-mentioned N pieces of first storage areas 11 respectively have storage capacities equal to each other.

In the following description, when the spare storage areas 13A, 13B, . . . need not be distinguished from each other specially, they are referred to as "a spare storage area 13" generically.

According to the above embodiment, for example, when one or more of N pieces of storage devices 10 become abnormal in operation and thus the number of normal storage devices reduces down to M (2≦M<N) pieces, the control unit 20 sets newly a first storage area 11 for each of M pieces of normal storage devices 10 using the spare storage area 13. In this case, the newly set M pieces of first storage areas 11 is set such that the total storage capacity of the present M pieces of first storage areas is equal to or substantially equal to the total storage capacity of the original N pieces of first storage area 11. Also, owing to the writing property of the striping method, the smallest one of the capacities of the present M pieces of first storage areas becomes a factor which reduces the total storage capacity, thereby raising a possibility that those of the other remaining storage areas 11 exceeding the above-mentioned smallest capacity can be wasted. Therefore, preferably, the respective storage capacities of the present M pieces of first storage areas 11 may be set such that they are equal to each other.

For example, when the storage capacities of the original N pieces of first storage areas 11 are respectively set for S, the new M pieces of first storage areas 11 are set such that their storage capacities may be (N·S/M). And, the control unit 20 divides and writes the electronic information to be written into the newly set M pieces of first storage areas 11. According to this embodiment, even when one or more of the N pieces of storage devices 10 become abnormal in operation, as a storage area for a first kind of electronic information, there is secured a storage area the size of which is equal to or substantially equal to a storage area which is normal. Here, for example, in a case where there is generated a remainder in the result of the operation of (N·S/M), when each of M pieces of normal storage devices 10 or any one of the M pieces of normal storage devices 10 is selectively set such that the storage capacity thereof is larger than the storage capacity (N·S/M) by such an amount capable of making up for this remainder, the sum of the storage capacities of M pieces of first storage areas 11 is larger than the total storage capacity of the original N pieces of first storage areas and the storage capacity when normal. In other words, according to the embodiment shown in FIG. 2, the total storage capacity of M pieces of first storage areas 11, when it is set larger than the storage capacity (N·S/M) by such an amount capable of making up for this remainder, is substantially equal to the total storage capacity of the original N pieces of storage areas 11 and also substantially equal to the storage capacity when the storage devices 10 are all normal in operation.

Also, according to another embodiment, when (N−1) pieces of storage devices 10 become abnormal in operation and thus the number of normal storage devices 10 reduces down to one, the control unit 20 sets newly a first storage area 11 for the normal single storage device 10 using a spare storage area 13. In this case, the new first storage area 11 is set such that the storage capacity thereof becomes equal to the total storage capacity of the original N pieces of storage areas 11. For example, when the storage capacities of the original N pieces of first storage areas 11 are respectively set for S, the new first storage area 11 is set such that it has a storage capacity (N·S). And, the control unit 20 writes the electronic information to be written into the newly set single first storage area 11. According to this embodiment, even when (N−1) pieces of storage devices 10 become abnormal in operation, as a storage area for a first kind of electronic information, there is secured a storage area the size of which is the same as when normal.

In the above storage system 1, when one or more storage devices 10 become abnormal, in one embodiment, the control unit 20 carries out an initializing processing (that is, a formatting processing) to set a new first storage area 11 in a normal storage device 10 and, using the normal storage device 10, maintains a function to record first and second kinds of electronic information. After then, when the abnormal storage device 10 is replaced with a new storage device 10, the control unit 20 restores the first storage area 11 using the format as well as restores the second storage area 12 using a reproducing processing (that is, a rebuilding processing). In one embodiment, the second storage area 12 is divided into a plurality of storage areas. In this embodiment, when the abnormal storage device 10 is replaced with a new storage device 10, of the above-mentioned plurality of storage areas, the areas unused are restored according to a formatting processing not according to a rebuilding processing.

By the way, the larger the number of storage devices 10 is, the shorter the mean time between failures (MTBF) is and the higher the cost is. Therefore, from the viewpoint of MTBF and cost, in one embodiment, the storage system 1 may be composed of two storage devices 10.

Figure 3:
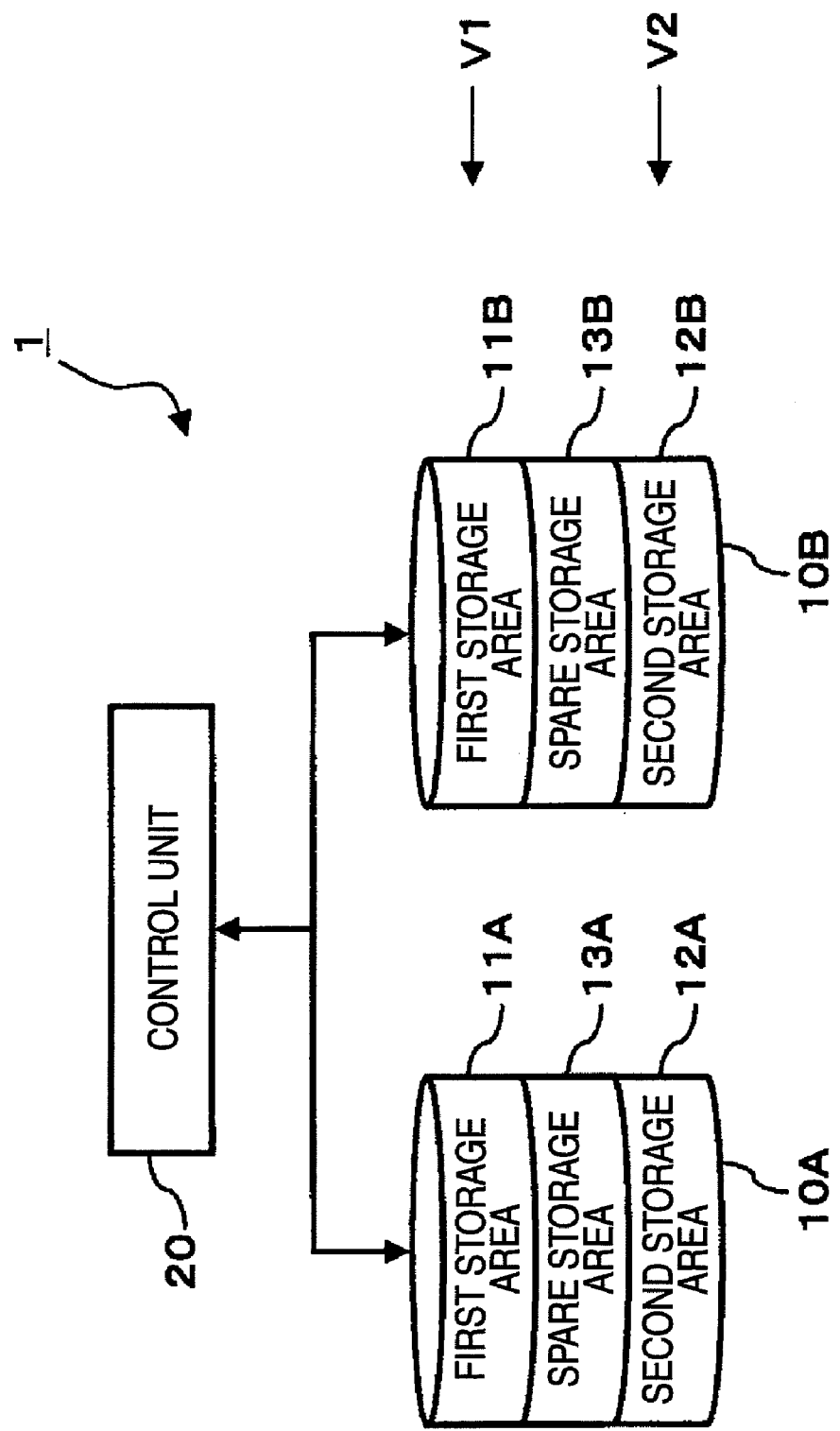
FIG. 3 is a block diagram of an example of the structure of a storage system including two storage devices.

FIG. 3 is a block diagram of an example of the structure of a storage system 1 including two storage devices 10. In an example shown in FIG. 3, the storage system 1 includes two storage devices 10A and 10B. The storage areas of the two storage devices 10A and 10B are respectively divided to a first storage area 11, a spare storage area 13 and a second storage area 12. The storage capacity of the first storage area 11 and the storage capacity of the spare storage area 13 are equal to each other. The first storage areas 11A and 11B cooperate together in constituting a first volume V1, while the second storage areas 12A and 12B cooperate together in constituting a second volume V2.

Figure 4:
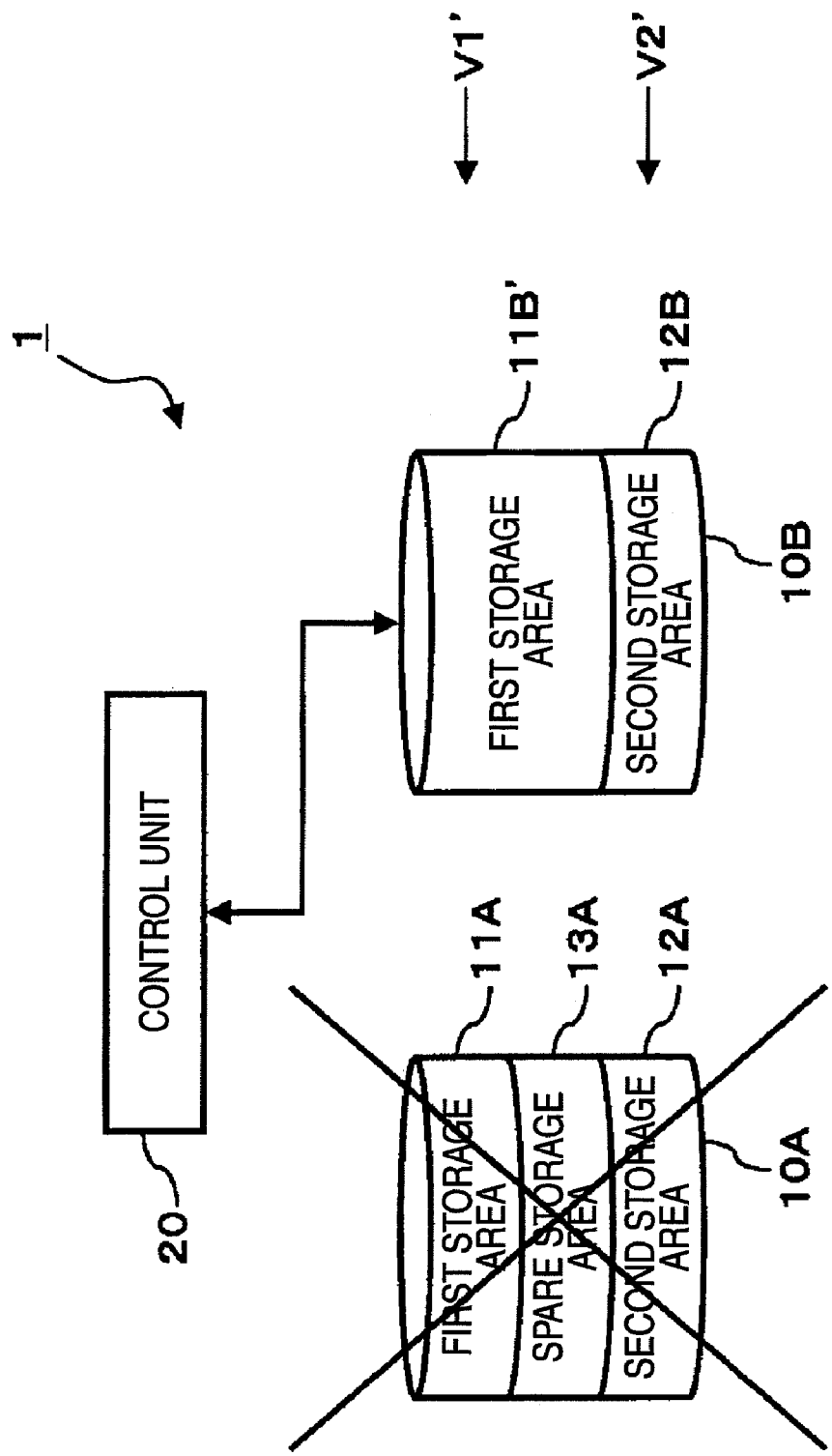
FIG. 4 is a block diagram of the storage system shown in FIG. 3, showing a state where one of the two storage devices fails.

FIG. 4 is a block diagram of the storage system shown in FIG. 3, showing a state where one storage device 10A fails. As shown in FIG. 4, when one storage device 10A fails or becomes abnormal in operation, the control unit 20 carries out a processing on the other storage device 10B, specifically, connects together the first storage area 11B and spare storage area 13B to thereby provide a new first storage area 11B'. Owing to this, as a storage area for recording a first kind of electronic information, there is secured a storage area having a size equal to that of a storage area when the storage device 10A is in a normal state. The control unit 20 carries out, for example, an area initializing operation (a formatting operation) in the system starting time after the storage device 10 becomes abnormal in operation. In FIG. 4, the new first storage area 11B' constitutes a first volume V1', while the second storage area 12B constitutes a second volume V2'. Depending on operating systems (OS) or upper-level applications, it seems that the structure of the volume is not changed between before and after the storage device 10 becomes abnormal in operation.

Here, when, in the spare storage area, it is not possible to secure a storage area equal to or substantially equal to a storage area which is (N−1) times as large as the first storage area, it is also possible to control a memory area in such a manner that unnecessary data stored in the first or second storage area are deleted sequentially to thereby secure such storage area. As the unnecessary data, for example, in a storage system according to the invention employed in an image forming apparatus 100 (which will be discussed later), there can be pointed out, for example, image data relating to the images that have been already formed.

Figure 5:
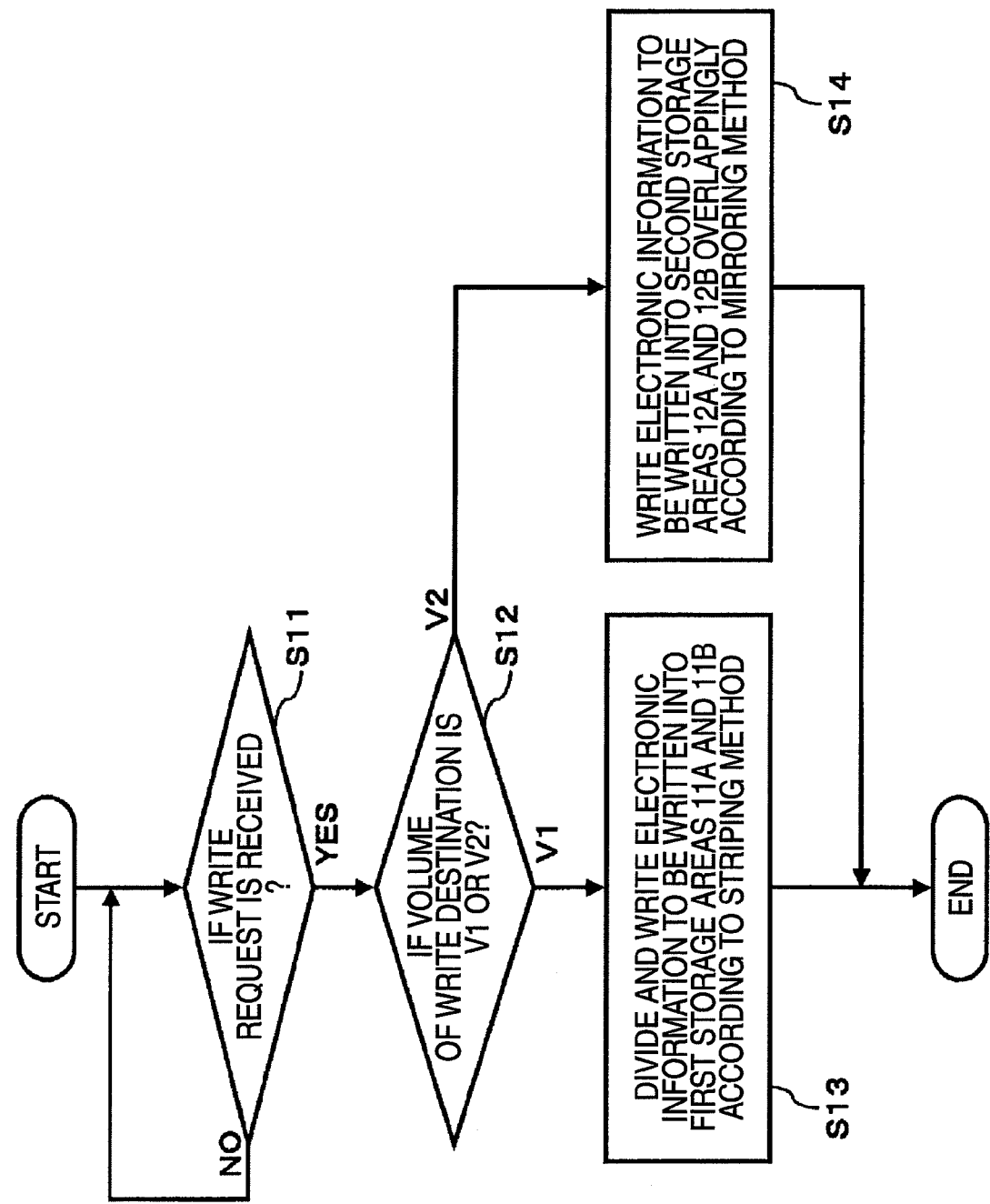
FIG. 5 is a flow chart of an example of the operation of a control unit.

FIG. 5 is a flow chart of an example of the operation of the control unit 20. Now, description will be given below of an example of the operation of the control unit 20 with reference to FIG. 5. Here, the description will be given using the storage system 1 shown in FIG. 3.

The control unit 20 waits until it receives a write request including the electronic information to be written and a pass serving as information for showing the writing destination (S11: NO) and, when it receives the write request (S11: YES), it advances the processing to Step 12.

In Step S12, the control unit 20 checks whether the pass included in the write request specifies the first volume V1 or second volume V2. That is, the control unit 20 checks whether the write destination of the electronic information to be written is the first volume V1 or second volume V2.

When it is decided that the pass specifies the first volume (S12: V1), the control unit 20 divides and writes the electronic information to be written included in the write request into the two first storage areas 11A and 11B according to a striping method (S13).

On the other hand, when it is decided that the pass specifies the second volume (S12: V2), the control unit 20 writes the electronic information to be written included in the write request into the two second storage areas 12A and 12B overlappingly according to a mirroring method (S14).

Figure 6:
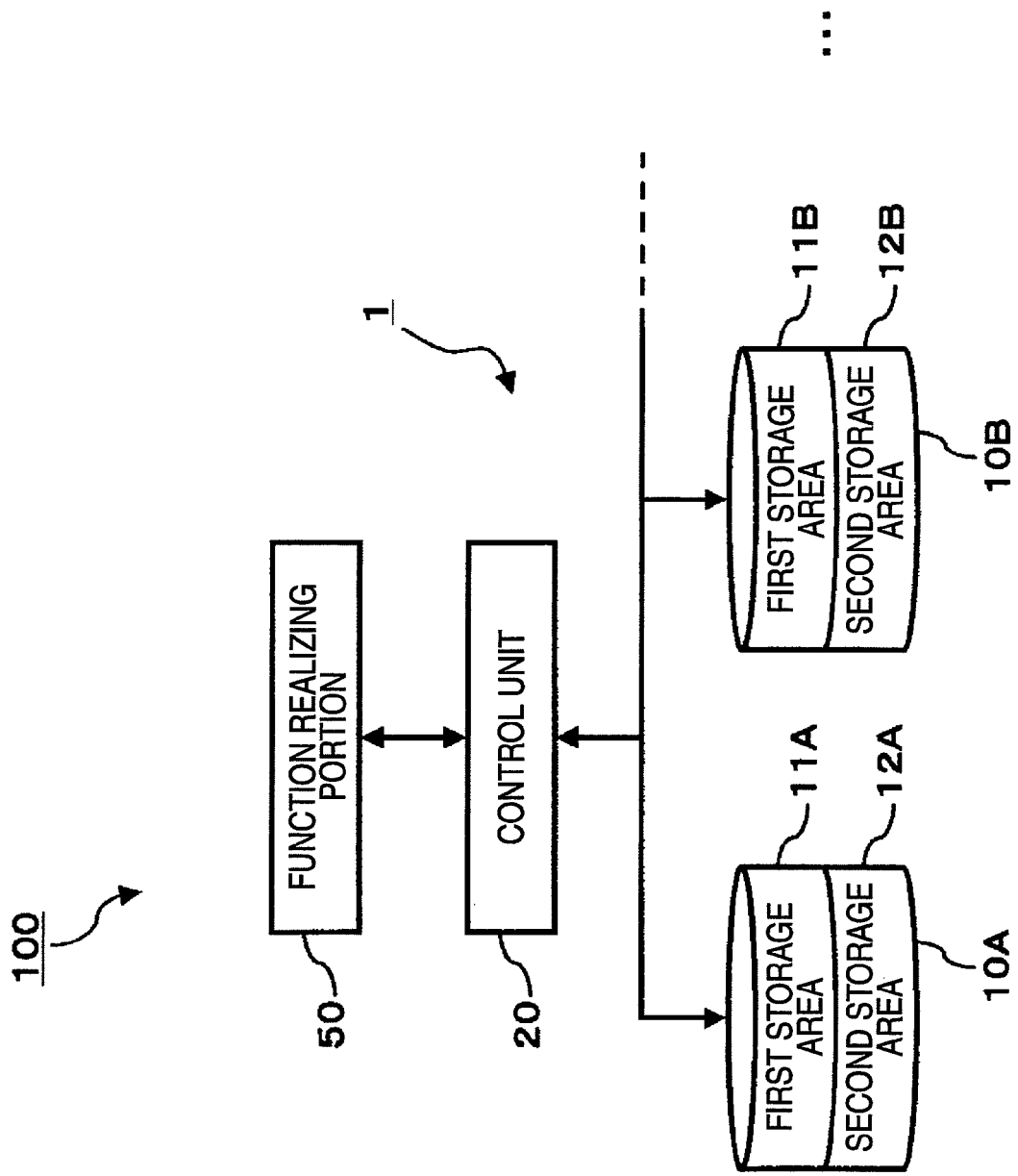
FIG. 6 is a block diagram of an example of the structure of an image forming apparatus including a storage system according to the embodiment of the invention.

FIG. 6 is a block diagram of an example of the structure of an image forming apparatus 100 including the storage system according to the present embodiment. Now, description will be given below of the image forming apparatus 100 with reference to FIG. 6.

The image forming apparatus 100 is a system which realizes a given function using the storage system 1. The image forming apparatus 100 is not specially limited but it may be, for example, a printing apparatus or a composite machine.

In FIG. 6, the image forming apparatus 100 includes the storage system 1 and a function realizing portion 50 which realizes a given function using the storage system 1.

The function realizing portion 50 reads and writes electronic information with respect to N pieces of storage devices 10 through the control unit 20 to thereby realize a given function. For example, the control unit 20 and function realizing portion 50 can be realized by a single computer. In this case, for example, the control unit 20 can be realized by an operating system (os) or the like, while the function realizing portion 50 can be realized by application software. In another embodiment, the function realizing portion 50 is physically provided separately from the control unit 20. For example, the control unit 20 and function realizing portion 50 can be realized by two computers which are connected together in a mutually communicatable manner.

In the storage system 1, when one or more of N pieces of the storage devices 10 fail, the number of the normal storage devices 10 is decreased, whereby the access speed of the first storage area 11 is reduced.

In view of this, when one or more of N pieces of storage devices 10 are abnormal in operation, the control unit 20 not only carries out an electronic information read and write operation using the normal ones of N pieces of storage devices 10 in order that the function realizing portion 50 can realize its function, but also executes a control operation to limit the function of the function realizing portion 50. Owing to this, even when one or more of N pieces of storage devices 10 fail and the access speed of the first storage area 11 is thereby reduced, the image forming apparatus 100 does not fail in operation but is able to operate in a state where the function thereof is limited.

In one embodiment, the function realizing portion 50 is an image forming portion which writes image information serving as a first kind of electronic information into N pieces of storage devices 10, reads the thus written image information from N pieces of storage devices 10 and, based on the thus read-out image information, forms an image on a recording medium such as paper. According to this embodiment, when one or more of N pieces of storage devices 10 are abnormal in operation, the control unit 20 not only carries out an electronic information read and write operation using the normal ones of N pieces of storage devices 10 in order that the function realizing portion 50 can realize the image formation, but also executes a control operation to reduce the speed of the image formation by the function realizing portion 50 and the resolution of the image.

In an embodiment, the control unit 20 has a function to accept from a user the setting of the operation when one or more of N pieces of storage devices 10 fail. For example, the control unit 20 displays an operation setting screen for storage device failure on a user interface, and accepts the operation setting on this operation setting screen.

FIG. 7 shows an example of the operation setting screen for storage device failure in a composite machine. In an example shown in FIG. 7, as an operation for storage device failure, there can be selected any one of the following operations, that is, "stop", "low speed output", "low resolution output" and "stop of specific function". When "stop" is selected, the control unit 20 stops all functions of the image forming apparatus (here, the printing apparatus) 100. When "low speed output" is selected, the control unit 20 reduces the output speed of printing down to or lower than a given speed to thereby correspond it to the reduced access speed. When "low resolution output" is selected, the control unit 20 reduces the resolution of the output image down to or lower than a given resolution to thereby correspond it to the reduced access speed. When "stop of specific function" is selected, the control unit 20 stops a specific function, in which there can be raised a problem due to the reduced access speed, and makes it possible to use other function than the above-mentioned specific function that raises no problem even when the access speed is reduced. Here, as the above-mentioned specific function, for example, there can be pointed out a copy function or a printer function. On the other hand, as the other function than the above-mentioned specific function, for example, there can be pointed out an edit function for an address book and a user setting as well as the receiving function of a facsimile.

Figure 8:
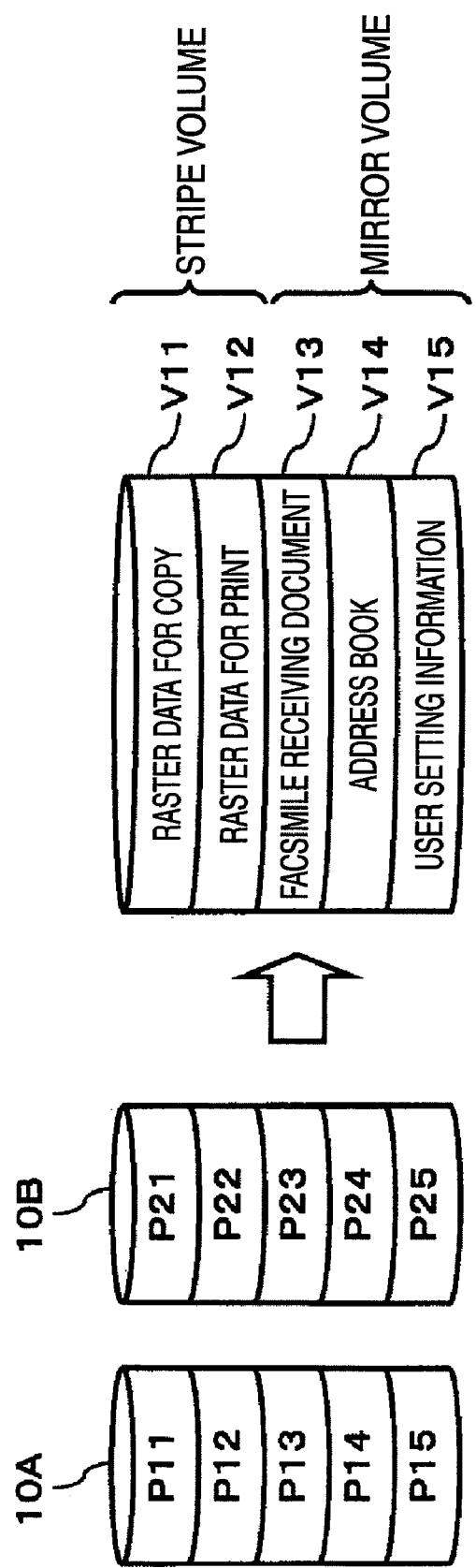
FIG. 8 is a view of an example of storage areas used in a composite machine.

FIG. 8 shows the state of storage areas employed in a composite machine. In FIG. 8, the composite machine includes storage devices 10A and 10B. The storage device 10A is divided to five partitions P11~P15, while the storage device 10B is divided to five partitions P21~P25. The partitions P11 and P21 cooperate together in constituting a volume V11, the partitions P12 and P22 cooperate together in constituting a volume V12, the partitions P13 and P23 cooperate together in constituting a volume V13, the partitions P14 and P24 cooperate together in constituting a volume V14, and the partitions P15 and P25 cooperate together in constituting a volume a volume V15. The volume V11 is an area for storing raster data for copy, the volume V12 is an area for storing raster data for print, the volume V13 is an area for storing facsimile receiving documents, the volume V14 is an area for storing an address book, and the volume V15 is an area for storing user setting information. Since the raster data for copy and print are the data that need not long storage but need high speed performance, the volumes V11 and V12 are respectively a stripe volume which can be accessed according to a striping method (RAID0). On the other hand, since the facsimile receiving documents, address book and user setting information are the data that need long storage, the volumes V13~V15 are respectively a mirror volume which can be accessed according to a mirroring method (RAID1).

In FIG. 8, when one of the two storage devices 10 fails, the data of the volumes V11 and V12, which are respectively a stripe volume, cannot be restored. However, the raster data for copy can be created again from a copy manuscript, and the raster data for print can be created again from PDL data. On the other hand, in the volumes V13~V15 which are respectively a mirror volume, even one of the storage devices 10 fails, since the data are stored in the other storage device 10, there is no possibility that the data can be lost.

The present invention is not limited to the above-mentioned embodiment but there are possible various changes without departing from the scope of the subject matter of the invention.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A storage system comprising:
   a first storage device;
   a second storage device;
   a processor that determines whether a type of data to be stored in at least one of the first storage device and the second storage device is one of a first type of data, wherein the first type of data comprises raster data, or a second type of data, wherein the second type of data comprises page description language (PDL) data, in response to determining the type of the data is the first type of data, divides the data into a first piece of data and a second piece of data, stores the first piece of data in the first storage device, and stores the second piece of data in the second storage device, and, in response to determining the type of the data is the second type of data, stores the data in the first storage device and stores the data in the second storage device.

2. The storage system as claimed in claim 1, wherein the processor stores the first piece of data in the first storage device and stores the second piece of data in the second storage device according to a RAID 0 configuration of the first storage device and the second storage device, and stores the data in the first storage device and stores the data in the second storage device according to a RAID 1 configuration of the first storage device and the second storage device.

3. A processor comprising:
   an obtaining unit that obtains electronic information to be written to at least one of a first storage device and a second storage device; and
   a control unit that determines whether a type of the electronic information is one of a first kind of electronic information, wherein the first kind of electronic information comprises raster data, or a second kind of electronic information, wherein the second kind of electronic information comprises page description language (PDL) data, in response to determining the kind of the electronic information is the first kind of electronic information, divides the electronic information into a first piece of electronic information and a second piece of electronic information, and writes the first piece of electronic information into the first storage device, and writes the second piece of electronic information into the second storage device, and, in response to determining the kind of the electronic information is the second kind of electronic information, writes the electronic information into the first storage device and the second storage device.

4. The processor as claimed in claim 3, wherein each of the first storage device and the second storage device comprises:
   a first storage area in which the electronic information to be written is divided and the divided electronic information is written; and
   a second storage area in which the electronic information to be written is redundantly written,
   wherein the control unit, in response to determining the kind of the electronic information is the first kind of electronic information, divides the electronic information into the first piece of electronic information and the second piece of electronic information, and writes the first piece of electronic information into the first storage area in the first storage device and the second storage device, and, in response to determining the kind of the electronic information is the second kind of electronic information, redundantly writes the electronic information into the second storage area in the first storage device and the second storage device.

5. The processor as claimed in claim 4, wherein the control unit, in a case where the electronic information is electronic information in which the first storage area is specified as a write destination thereof, divides the electronic information into the first piece of electronic information and the second piece of electronic information, and writes the first piece of electronic information into the first storage area in each of the first storage device and the second storage device, and the control unit, in a case where the electronic information is electronic information in which the second storage area is specified as the write destination thereof, redundantly writes the electronic information into each of the second storage area in the first storage device and the second storage device.

6. The control unit as claimed in claim 5, wherein, each first storage device and the second storage device comprises:
   a spare storage area that has a storage capacity substantially equal to a storage capacity (N−1) times as large as a storage capacity of the first storage area, and is used to store the first kind of electronic information,
   wherein the first storage device and the second storage device comprise N storage devices and N is an integer.

7. The control unit as claimed in claim 5, wherein the first kind of electronic information is electronic information that does not require long storage, and the second kind of electronic information is electronic information that requires the long storage.

8. The control unit as claimed in claim 5, wherein the first kind of electronic information is electronic information that requires high speed performance, and the second kind of electronic information is electronic information that does not require the high speed performance.

9. The control unit as claimed in claim 4, wherein, each of the first storage device and the second storage device comprises:
   a spare storage area that has a storage capacity substantially equal to a storage capacity (N−1) times as large as a storage capacity of the first storage area, and is used to store the first kind of electronic information,
   wherein the first storage device and the second storage device comprise N storage devices and N is an integer.

10. The control unit as claimed in claim 9, wherein the first kind of electronic information is electronic information that does not require long storage, and the second kind of electronic information is electronic information that requires the long storage.

11. The control unit as claimed in claim 9, wherein the first kind of electronic information is electronic information that requires high speed performance, and the second kind of electronic information is electronic information that does not require the high speed performance.

12. The control unit as claimed in claim 4, wherein the first kind of electronic information is electronic information that does not require long storage, and the second kind of electronic information is electronic information that requires the long storage.

13. The control unit as claimed in claim 4, wherein the first kind of electronic information is electronic information that requires high speed performance, and the second kind of electronic information is electronic information that does not require the high speed performance.

14. The control unit as claimed in claim 3, wherein the first kind of electronic information is electronic information that does not require long storage, and the second kind of electronic information is electronic information that requires the long storage.

15. The control unit as claimed in claim 3, wherein the first kind of electronic information is electronic information that requires high speed performance, and the second kind of electronic information is electronic information that does not require the high speed performance.

16. An image forming apparatus comprising:
a first storage device;
a second storage device;
a processor unit that determines whether a kind of the electronic information is one of a first kind of electronic information, wherein the first kind of electronic information comprises raster data, or a second kind of electronic information, wherein the second kind of electronic information comprises page description language (PDL) data, in response to determining the kind of the electronic information is the first kind of electronic information, divides the electronic information into a first piece of electronic information and a second piece of electronic information, and writes the first piece of electronic information into the first storage device, and writes the second piece of electronic information into the second storage device, and, in response to determining the kind of the electronic information is the second kind of electronic information, writes the electronic information into the first storage device and the second storage device; and
a function realizing unit that reads and writes the electronic information into the first storage device and the second storage device through the processor to realize a predetermined function,
wherein the processor, in a case where one of the first storage device and the second storage device is abnormal in operation, reads and writes the electronic information by using the one of the first storage device and the second storage device being normal in operation so that the function realizing unit realizes a function thereof.

17. The image forming apparatus as claimed in claim 16, wherein the function realizing unit is an image forming unit that writes image information serving as the first kind of electronic information into the first storage device and the second storage device, reads out the written image information from the first storage device and the second storage device, and forms an image on a recording medium based on the read-out image information, and the processor, in a case where the one of the first storage device and the second storage device is abnormal in operation, reads and writes the electronic information by using the one of the first storage device and the second storage device being normal in operation so that the function realizing unit realizes a function thereof, and reduces a speed of the image formation or a resolution of the image realized by the function realizing unit.

18. An information storing method comprising:
determining, by a processor, whether a type of data to be stored in at least one of a first storage device and a second storage device is one of a first type of data, wherein the first type of data comprises raster data, or a second type of data, wherein the second type of data comprises page description language (PDL) data;
dividing the data into a first piece of data and a second piece of data, storing the first piece of data in the first storage device, and storing the second piece of data in the second storage device, in response to determining the type of the data is the first type of data; and
storing the data in the first storage device and storing the data in the second storage device, in response to determining the type of the data is the second type of data.

19. A non-transitory computer readable medium storing a program causing a computer to execute a process for storing electronic information, the process comprising:
determining, by a processor, whether a type of data to be stored in at least one of a first storage device and a second storage device is one of a first type of data, wherein the first type of data comprises raster data, or a second type of data, wherein the second type of data comprises page description language (PDL) data;
dividing the data into a first piece of data and a second piece of data, storing the first piece of data in the first storage device, and storing the second piece of data in the second storage device, in response to determining the type of the data is the first type of data; and
storing the data in the first storage device and storing the data in the second storage device, in response to determining the type of the data is the second type of data.

* * * * *